United States Patent
Yoshikawa et al.

(10) Patent No.: US 7,850,319 B2
(45) Date of Patent: Dec. 14, 2010

(54) LIGHT-ABSORBING MEMBER

(75) Inventors: Motonobu Yoshikawa, Osaka (JP); Yoshiharu Yamamoto, Toyonaka (JP); Michihiro Yamagata, Osaka (JP); Yasuhiro Tanaka, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 285 days.

(21) Appl. No.: 11/597,651

(22) PCT Filed: May 16, 2005

(86) PCT No.: PCT/JP2005/009293

§ 371 (c)(1),
(2), (4) Date: Nov. 27, 2006

(87) PCT Pub. No.: WO2005/116695

PCT Pub. Date: Dec. 8, 2005

(65) Prior Publication Data

US 2007/0247718 A1    Oct. 25, 2007

(30) Foreign Application Priority Data

May 27, 2004  (JP) .............................. 2004-158221

(51) Int. Cl.
    G02B 27/00   (2006.01)
(52) U.S. Cl. .................................... 359/614
(58) Field of Classification Search .................. 359/614
    See application file for complete search history.

(56) References Cited

U.S. PATENT DOCUMENTS

| 4,013,465 A * | 3/1977 | Clapham et al. ............... 430/11 |
| 4,111,762 A * | 9/1978 | Wade et al. .................. 205/208 |
| 4,322,125 A | 3/1982 | Warren |
| 4,396,643 A * | 8/1983 | Kuehn et al. ................. 427/160 |
| 4,589,972 A * | 5/1986 | Pompea et al. .............. 205/205 |
| 4,812,352 A | 3/1989 | Debe |

(Continued)

FOREIGN PATENT DOCUMENTS

CN    1447134 A    10/2003

(Continued)

OTHER PUBLICATIONS

T. Kanamori, et al. "Broadband antireflection gratings fabricated upon silicon substrates" Optics Letters, Oct. 15, 1999, vol. 24, No. 20, pp. 1422-1424.

(Continued)

*Primary Examiner*—Mark Consilvio
(74) *Attorney, Agent, or Firm*—McDermott Will & Emery LLP

(57) ABSTRACT

A light-absorbing member has a substrate (101, 111) made of a material capable of absorbing light of which reflection is to be prevented, and an antireflection structure (102, 112, 303) having structural elements arranged on the surface of the curve in an array form at a period smaller than the wavelength of the light. The substrate having the shape of a curve viewed from a macroscopic viewpoint. The structural elements have a shape protruding or being recessed from a reference face corresponding to the curve of the substrate, and are arranged so that the straight lines connecting the reference face to the tips of the respective structural elements are nearly parallel to one another.

18 Claims, 12 Drawing Sheets

U.S. PATENT DOCUMENTS

| | | | |
|---|---|---|---|
| 5,039,561 A | 8/1991 | Debe | |
| 5,212,596 A * | 5/1993 | Andrus | 359/614 |
| 5,225,933 A * | 7/1993 | Myers et al. | 359/614 |
| 5,353,070 A | 10/1994 | Mitani et al. | |
| 6,175,442 B1 | 1/2001 | Booth, Jr. et al. | |
| 6,326,723 B1 * | 12/2001 | Raj et al. | 313/461 |
| 6,514,674 B1 | 2/2003 | Iwasaki | |
| 7,094,452 B2 | 8/2006 | Yamashita et al. | |
| 2002/0008461 A1 | 1/2002 | Raj et al. | |
| 2003/0180476 A1 | 9/2003 | Yamashita et al. | |
| 2003/0210468 A1 | 11/2003 | Kato | |
| 2004/0032667 A1 | 2/2004 | Gale et al. | |
| 2005/0074579 A1 * | 4/2005 | Suzuki et al. | 428/141 |
| 2005/0093210 A1 * | 5/2005 | Umetani et al. | 264/528 |
| 2005/0094277 A1 * | 5/2005 | Khusnatdinov et al. | 359/601 |
| 2007/0159698 A1 * | 7/2007 | Taguchi et al. | 359/586 |

FOREIGN PATENT DOCUMENTS

| | | | |
|---|---|---|---|
| EP | 0 766 102 A1 | | 4/1997 |
| JP | 62-096902 | | 5/1987 |
| JP | 63-107548 | | 5/1988 |
| JP | 11-242150 | | 9/1999 |
| JP | 2000-258607 | | 9/2000 |
| JP | 2001-66693 | | 3/2001 |
| JP | 2003-266580 | | 9/2003 |
| JP | 2003-322711 | | 11/2003 |
| JP | 2004-12856 | | 1/2004 |
| JP | 2004012856 A | * | 1/2004 |
| WO | WO 95/23710 | | 9/1995 |
| WO | WO 2005088355 A | * | 9/2005 |

OTHER PUBLICATIONS

Japanese Office Action issued in Japanese Patent Application No. 2006-544760, mailed Aug. 17, 2009.

Japanese Office Action issued in Japanese Patent Application No. 2006-544760, mailed Jul. 2, 2010.

Chinese Office Action, with English translation, issued in Chinese Patent Application No. CN 2005800169343, mailed Oct. 12, 2007.

* cited by examiner

LIGHT-ABSORBING MEMBER

RELATED APPLICATIONS

This application is a national phase of PCT/JP2005/009293 filed on May 16, 2005, which claims priority from Japanese Application No. 2004-158221 filed May 27, 2004 the disclosures of which Applications are incorporated by reference herein. The benefit of the filing and priority dates of the International and Japanese Applications is respectfully requested.

TECHNICAL FIELD

The present invention relates to a light-absorbing member, more particularly, to a light-absorbing member capable of efficiently absorbing unnecessary light in optical apparatuses, such as projection display devices and image-taking devices.

BACKGROUND ART

In an optical apparatus, the handling of unnecessary light inside the apparatus is important. Herein, unnecessary light is defined as light propagated along unintended light paths inside the optical apparatus and not used to achieve the intrinsic functions of the optical system. Such unnecessary light frequently causes degradation in the performance of the optical apparatus.

As a method for obtaining a large-screen image, for example, a projection image display device is known wherein an optical image corresponding to an image signal is formed on a light valve and the optical image is magnified and projected on a screen by a projection lens. As an example of this kind of projection image display device, a device using a reflective light valve is available wherein an optical image is formed by controlling the traveling direction of illumination light in accordance with an image signal. Such a projection image display device using a reflective light valve has high light utilization efficiency and can display projection images having high luminance.

In a projection display device using a reflective light valve, illumination light components not entering its projection lens become unnecessary light that is the so-called OFF light. However, if no countermeasures are taken, the OFF light is reflected by prisms disposed around the light valve, mechanical parts for holding various optical elements, etc. and eventually enters the projection lens. If the OFF light eventually enters the projection lens, the quality of an image to be displayed on the screen is degraded significantly. Hence, in this kind of projection display device, an absorbing plate coated with black paint has been used conventionally to absorb the OFF light (for example, refer to Japanese Laid-open Patent Publication No. 2001-66693).

In addition, as another example, a countermeasure for unnecessary light in the above-mentioned projection lens and the lens barrel for holding the image-taking optical system being used in optical apparatuses, such as digital still cameras and camcorders, has been known conventionally. Generally, the light reflected between the faces of the lenses inside a lens barrel and the light reflected by the mechanical parts for holding various optical elements become unnecessary light referred to as stray light. The stray light may occasionally return to the light path of the optical system along complicated reflection light paths. In the cases of the above-mentioned projection lens and an imaging optical system, such as the image-taking optical system of a digital still camera or the like, the stray light causes ghost or flare in the optical system, thereby causing degradation in the image quality of an image to be formed. Hence, in a conventional lens barrel, the internal face of the barrel is made of a black material or matte finished to prevent generation of stray light (for example, refer to Japanese Laid-open Patent Publication No. 2003-266580).

DISCLOSURE OF THE INVENTION

However, in the case of using the absorbing plate coated with black paint, as in the example of the projection display device described in Japanese Laid-open Patent Publication No. 2001-66693, the surface of the absorbing plate becomes an interface with air, thereby causing a problem of allowing OFF light to be reflected at an unignorable rate and to return to the light path. Furthermore, as in the example of the lens barrel described in Japanese Laid-open Patent Publication No. 2003-266580, even if the internal face of the lens barrel is made of a black material or matte finished, it is also difficult to completely prevent stray light.

In particular, when a face, reflection by which is desired to be reduced, has the shape of a curve, the treatment of coating the face with black paint or the matte finishing of the face is in itself a cause of making the production process complicated; hence, if the effect of reducing reflection is slight even after the treatment is carried out, the disadvantage of making the production process complicated cannot be compensated for, resulting in a serious problem.

An object of the present invention is to provide a light-absorbing member capable of reducing the reflection of light at the interface with air and absorbing the light substantially completely for a member having the shape of a curve, in particular.

The above-mentioned object is achieved by a light-absorbing member comprising a substrate made of a material capable of absorbing light whose reflection should be reduced, and an antireflection structure comprising structural elements having a predetermined shape and arranged on the surface of a curve in an array form at a period smaller than the wavelength of the light whose reflection should be reduced, wherein the substrate has the shape of a curve viewed from a macroscopic viewpoint, and the structural elements have a shape protruding or being recessed from a reference face corresponding to the curve of the substrate, and are arranged so that the straight lines connecting the reference face to the tips of the respective structural elements are nearly parallel to one another.

In this description, the antireflection structure is defined as a member having microscopic structural elements formed on its surface to prevent the reflection of light whose reflection should be reduced, and includes not only an aspect of completely preventing the reflection of the light whose reflection should be reduced but also an aspect of having an effect of preventing the reflection of light which has a predetermined wavelength and whose reflection should be reduced. In addition, in this description, it is defined that the macroscopic curve corresponds to the shape of a surface larger than the wavelength of the light whose reflection should be reduced and conforms to the reference face wherein the shape of a surface smaller than the wavelength of the light whose reflection should be reduced is ignored.

The present invention can provide a light-absorbing member capable of preventing the reflection of light at the interface with air and absorbing the light substantially completely for a member having the shape of a curve, in particular.

BEST MODE FOR CARRYING OUT THE INVENTION

First Embodiment

Figure 1:
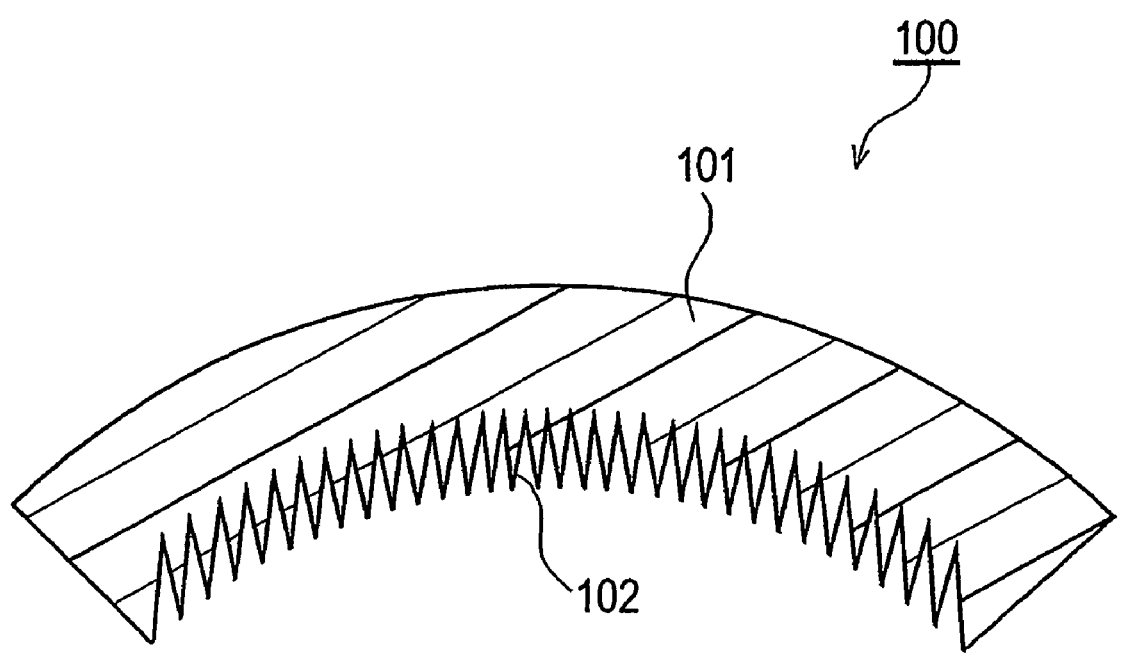
FIG. 1 is a schematic cross-sectional view showing a light-absorbing member in accordance with a first embodiment of the present invention, being cut off by a plane perpendicular to the longitudinal direction thereof.

FIG. 1 is a schematic cross-sectional view showing a light-absorbing member in accordance with a first embodiment of the present invention, being cut off by a plane perpendicular to the longitudinal direction thereof. As shown in FIG. 1, the light-absorbing member 100 in accordance with this embodiment comprises a substrate 101 and an antireflection structure 102. When light whose reflection should be reduced enters as a luminous flux, the substrate 101 has a size enclosing the luminous flux and also has mechanical strength and a thickness required in structure. In addition, the substrate 101 is made of a material capable of absorbing light whose reflection should be reduced; for example, it is made of a black material when the light whose reflection should be reduced is visible light. The black material is obtained by including a dye, such as a black dye (for example, Plast Black 8950 or 8970 produced by Arimoto Chemical Co., Ltd.) obtained by mixing cyan, magenta, yellow and other coloring matters, in a base material, such as polycarbonate resin or acrylic resin.

The substrate 101 has the shape of a curve constituting part of a side face of a cylinder viewed from a macroscopic viewpoint. The antireflection structure 102 is formed on the internal circumference side of this curve. When the antireflection structure 102 is formed on the substrate having the shape of a concave curve as described above and compared with that formed on a substrate having the shape of a convex curve, light reflected on the substrate is not scattered widely, but part of the light can reenter the antireflection structure 102, whereby its light-absorbing efficiency can be improved.

Furthermore, in the substrate 101, the amount of the sag of the curve viewed from a macroscopic viewpoint (the distance between the chord connecting both edges of the curve and the vertex of the curve) is set at 20 µm or more. If the amount of the sag is less than 20 µm, when a lens barrel having an inside diameter of 2 mm is produced using the light-absorbing member 100, for example, it is necessary to divide the lens barrel into 16 or more pieces, whereby the production cost increases.

In the antireflection structure 102, a protrusion having the shape of a cone of 0.15 µm in height is used as a structural element, and these cones are disposed on the surface of the substrate 101 in an array form at a period of 0.15 µm. The period between the cones herein corresponds to a period smaller than the wavelength of the visible spectrum (400 nm to 700 nm). In addition, the height of these cones corresponds to the period or more. Since the antireflection structure 102 of the light-absorbing member 100 has the above-mentioned configuration, even if light having a wavelength of the visible spectrum or longer enters, the light is not reflected but can be absorbed by the substrate 101 substantially completely.

Figure 2:
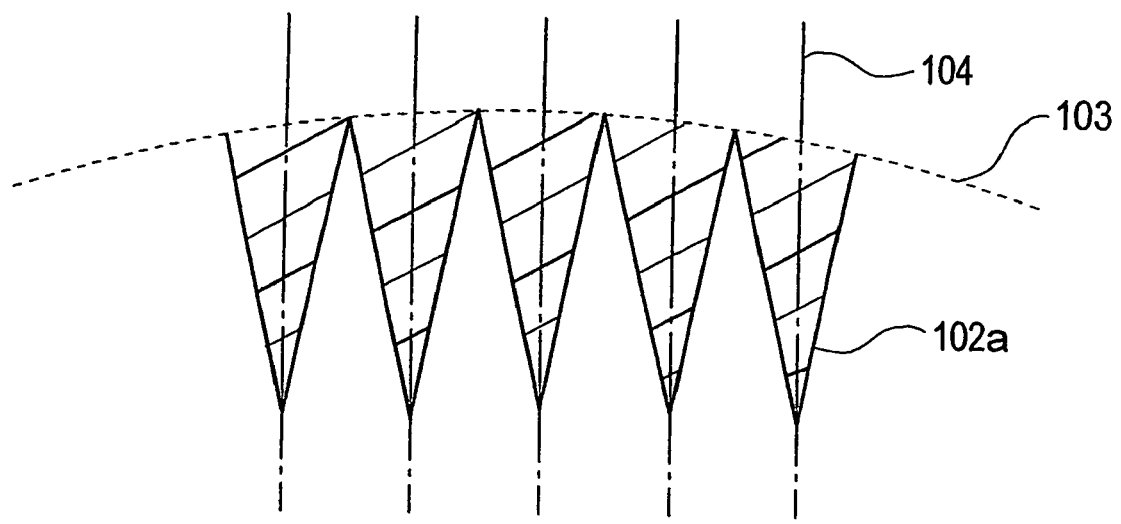
FIG. 2 is a magnified schematic perspective view showing an antireflection structure in accordance with the first embodiment.

FIG. 2 is a magnified schematic perspective view showing the antireflection structure in accordance with the first embodiment. As shown in FIG. 2, each of the structural elements 102a has a shape protruding from a reference face 103 corresponding to the macroscopic curve of the substrate. The respective structural elements 102a are arranged so that the straight lines 104 connecting the reference face 103 to the tips of the respective structural elements 102a are nearly parallel to one another. In particular, since the structural element in accordance with this embodiment has the shape of a cone, the straight line 104 corresponds to the straight line connecting the center of the bottom face of the cone of each structural element 102a to the vertex of the cone and is the center axis of the cone. In other words, each structural element 102a of the antireflection structure 102 in accordance with this embodiment has a shape such that when the structural element is viewed from the direction of the straight line 104 serving as a specific reference direction common to all the structural elements, the whole area of its side face can be seen.

Figure 3:
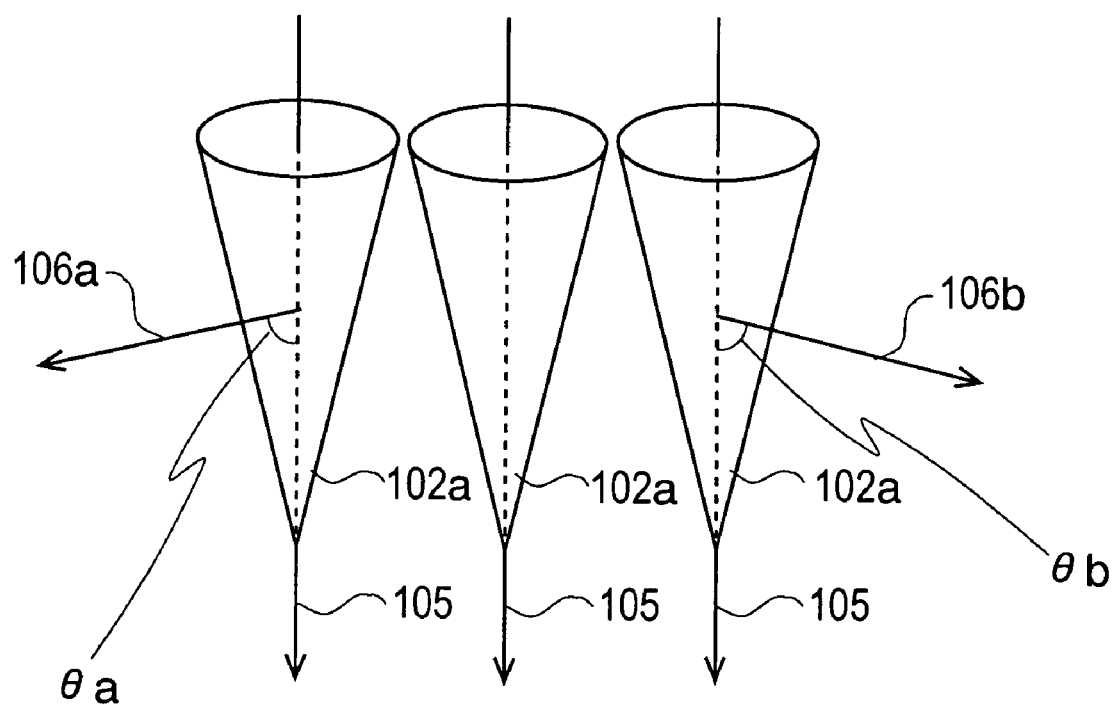
FIG. 3 is a schematic perspective view illustrating the inclination state of the side face of each structural element, having the shape of a protrusion, of the antireflection structure in accordance with the first embodiment.

FIG. 3 is a schematic perspective view illustrating the inclination state of the side face of each structural element, having the shape of a protrusion, of the antireflection structure in accordance with the first embodiment. As shown in FIG. 3, when it is assumed that the angles formed by the normal vectors 106a and 106b of the side face of the cone serving as each structural element 102a with respect to the reference vector 105 in the direction from the reference face 103 to the tip of each structural element 102a are θa and θb, respectively, in the case of the antireflection structure 102 comprising the structural elements arranged at a period of 0.15 μm and having the shape of a cone with a height of 0.15 μm (corresponding to the period), θa=θb =θ=63.4 degrees is obtained. In addition, in the case of the antireflection structure 102 with a height corresponding to the period or more, 63.4 degrees≦θ<90 degrees is obtained in consideration of the fact that the structural elements have the shape of a cone.

An example of a method for producing the light-absorbing member 100 will be described. For example, a pattern is drawn on a quartz glass substrate or the like by the electronic beam drawing method or the like and subjected to dry etching or other processing, and a high-precision master mold precision-machined so as to have the same shape as that of the antireflection structure 102 is made beforehand. A glass material heated and softened is subjected to pressure molding using this master mold, whereby a mold for molding antireflection structures is formed of glass. When the substrate 101 made of a black resin material is produced by pressure molding using this mold for molding antireflection structures, the light-absorbing member 100 can be produced at low cost in large quantity.

Since the light-absorbing member 100 in accordance with this embodiment is made by providing the microscopic antireflection structure 102 formed at a period smaller than the wavelength of the light whose reflection should be reduced on the surface of the substrate 101 as described above, the reflection of light at the interface with air can be prevented and incident light can be absorbed substantially completely by using this light-absorbing member 100.

Furthermore, the light-absorbing member 100 in accordance with this embodiment is advantageous when it is separated from the mold during pressure molding, in particular. In other words, since the respective structural elements of the antireflection structure 102 are arranged so that the straight lines 104 connecting the reference face 103 to the tips of the respective structural elements 102a are nearly parallel to one another, the light-absorbing member 100 in accordance with this embodiment can be separated from the mold without damaging the antireflection structure 102 during pressure molding.

In this embodiment, an antireflection structure having cones with a height corresponding to the period or more is formed; however, light-absorbing efficiency can be raised further by forming an antireflection structure having cones with a height corresponding to two or three times the period or more. In this case, θa=θb =θ shown in FIG. 3 becomes 75.9 degrees≦θ<90 degrees or 80.5 degrees≦θ<90 degrees, respectively.

In addition, in this embodiment, visible light is used as the light whose reflection should be reduced; however, other than visible light, ultraviolet light (the wavelength of ultraviolet spectrum: 70 nm to 400 nm), near-infrared light (the wavelength of near-infrared spectrum: 700 nm to 2 μm) and far-infrared light (the wavelength of far-infrared spectrum: 2 μm to 13 μm) can also be used; even in this case, the antireflection structure is formed at a period smaller than the respective wavelengths. Even in this case, the height of the structural element is desired to be a height corresponding to the period or more, two times the period or more, or three times the period or more.

Furthermore, in this embodiment, the substrate 101 made of a black material is obtained by including a dye, such as a black dye (for example, Plast Black 8950 or 8970 produced by Arimoto Chemical Co., Ltd.) obtained by mixing cyan, magenta, yellow and other coloring matters, in a base material, such as polycarbonate resin or acrylic resin; however, the substrate can also be obtained by including a pigment, such as carbon black.

Figure 4A:
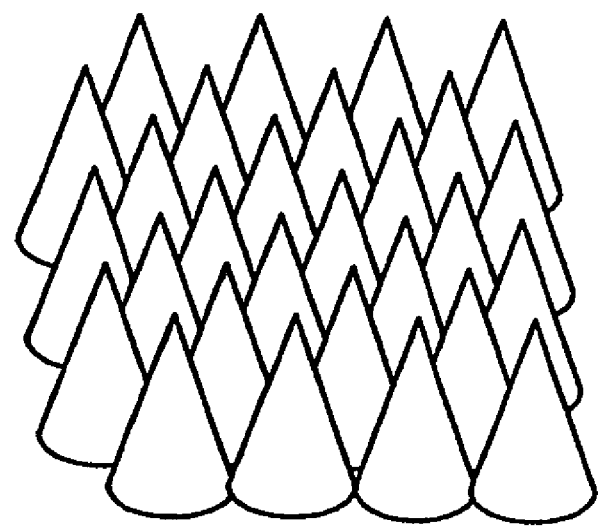
FIG. 4A is a magnified view showing the antireflection structure in accordance with the first embodiment.
Figure 4B:
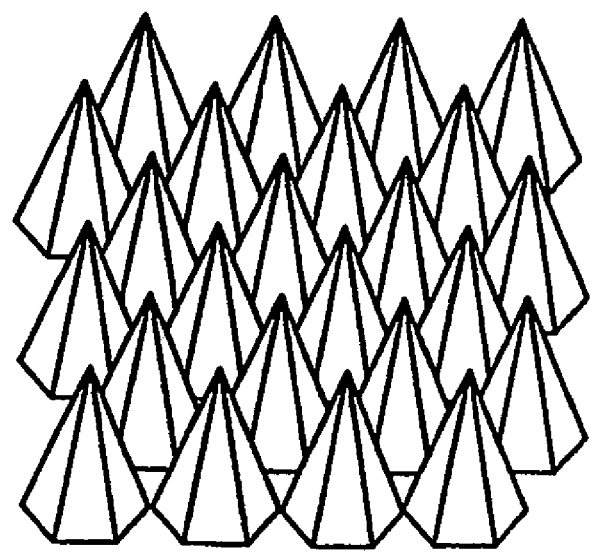
FIG. 4B is a magnified view showing the antireflection structure in accordance with the first embodiment.
Figure 5A:
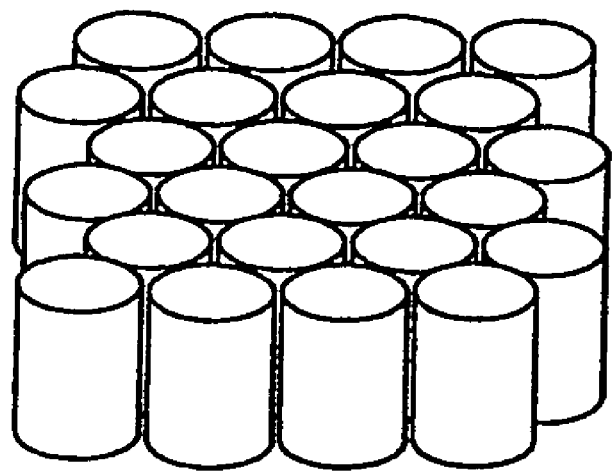
FIG. 5A is a magnified view showing modified examples of the antireflection structure in accordance with the first embodiment.
Figure 5B:
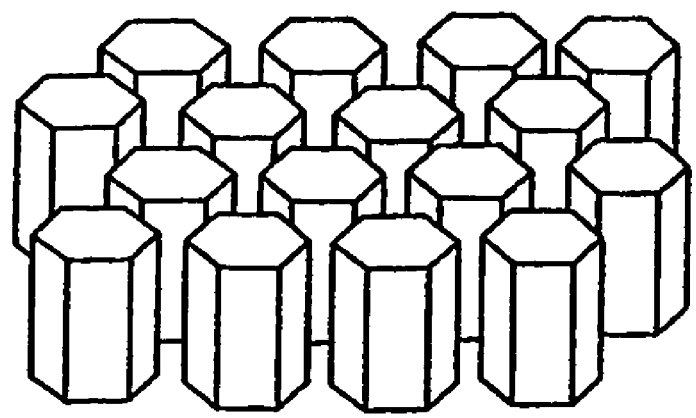
FIG. 5B is a magnified view showing modified examples of the antireflection structure in accordance with the first embodiment.
Figure 6A:
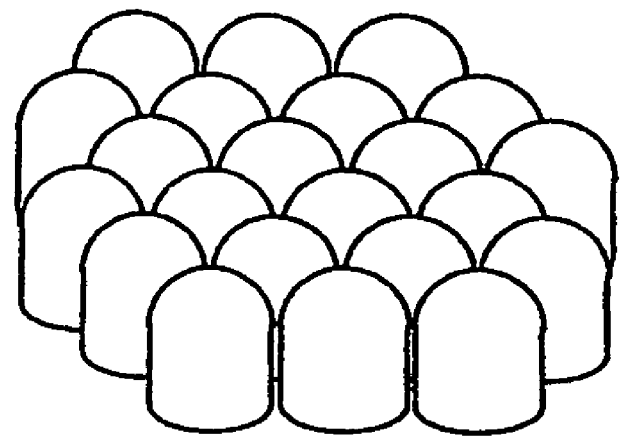
FIG. 6A is a magnified view showing modified examples of the antireflection structure in accordance with the first embodiment.
Figure 6B:
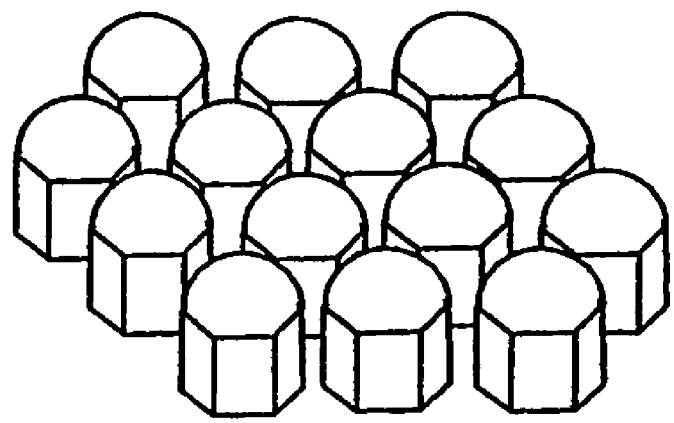
FIG. 6B is a magnified view showing modified examples of the antireflection structure in accordance with the first embodiment.
Figure 7A:
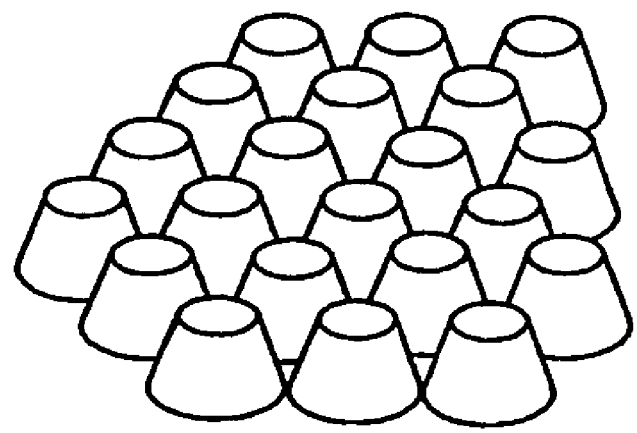
FIG. 7A is a magnified view showing modified examples of the antireflection structure in accordance with the first embodiment.
Figure 7B:
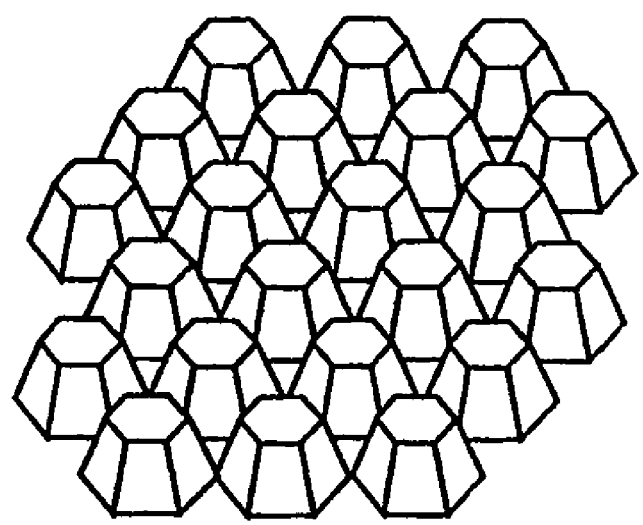
FIG. 7B is a magnified view showing modified examples of the antireflection structure in accordance with the first embodiment.

Moreover, in this embodiment, as the antireflection structure 102, an antireflection structure comprising structural elements having the shape of a cone (see FIG. 4A) is taken as an example and described; however, the antireflection structure is not necessary limited to this configuration. For example, the structural element may have the shape of a pyramid (see FIG. 4B), such as a regular hexagonal pyramid or a quadrangular pyramid. In addition, the shape of the structural element of the antireflection structure is not necessarily limited to a cone or a pyramid, but the shape may be a columnar shape, such as a cylinder (see FIG. 5A) or a prism (see FIG. 5B), a bell shape rounded at the tip (see FIGS. 6A and 6B) or a truncated cone or pyramid, such as a truncated cone (see FIG. 7A) or a truncated pyramid (see FIG. 7B), or the like. Still further, the structural element is not required to have a strictly geometrical shape, but its shape should only substantially be a cone or pyramid, a column, a bell, or a truncated cone or pyramid. Briefly speaking, the structural elements of the antireflection structure 102 should only be arranged at least at a period smaller than the wavelength of the light whose reflection should be reduced.

Furthermore, in this embodiment, as the antireflection structure 102, a structure comprising structural elements formed of protrusions having the shape of a cone is shown; however, the structure is not limited to this. For example, an antireflection structure wherein recesses having the shape of a cone are formed in an array form in a flat face may also be formed.

Figure 8:
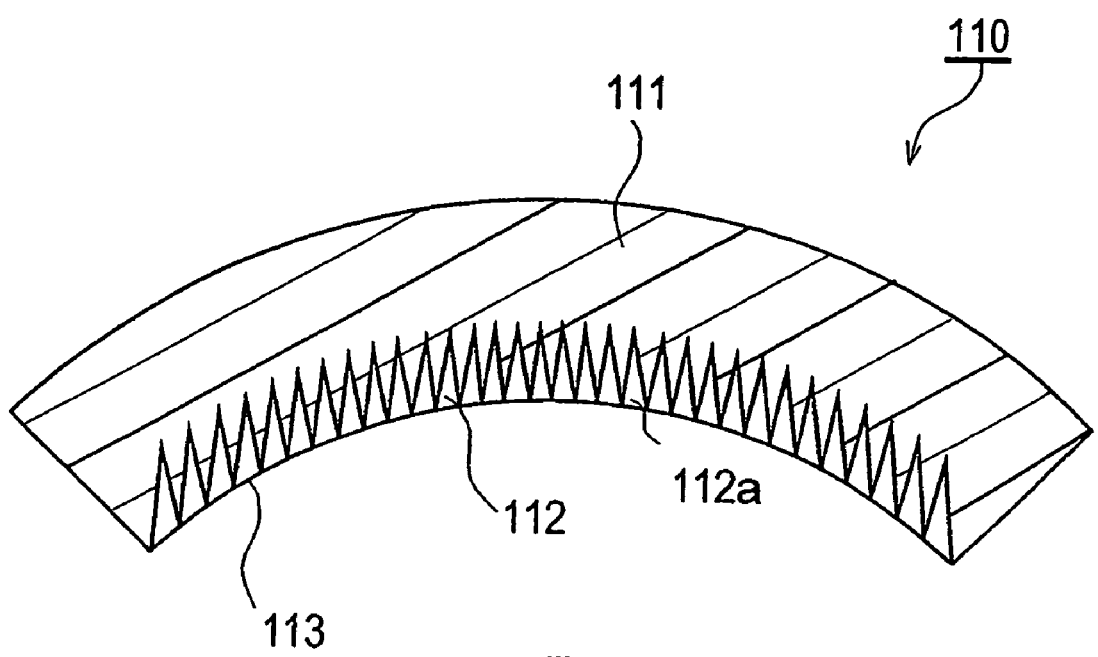
FIG. 8 is a schematic cross-sectional view showing a light-absorbing member in accordance with a modified example of the first embodiment, being cut off by a plane perpendicular to the longitudinal direction thereof.

FIG. 8 is a schematic cross-sectional view showing a light-absorbing member in accordance with a modified example of the first embodiment, being cut off by a plane perpendicular to the longitudinal direction thereof. In FIG. 8, the light-absorbing member 110 in accordance with the modified example of this embodiment comprises a substrate 111 and an antireflection structure 112. Since the light-absorbing member 110 in accordance with the modified example is identical to the light-absorbing member 100 in accordance with the first embodiment described above with respect to schematic configuration, the differences therebetween will be described mainly.

In the antireflection structure 112, a recess having the shape of a cone of 0.15 μm in depth is used as a structural element, and these cones are disposed on the surface of the substrate 111 in an array form at a period of 0.15 Ξm. The period between the cones herein corresponds to a period smaller than the wavelength of the visible spectrum (400 nm to 700 nm). In addition, the depth of these cones corresponds to the period or more. Since the antireflection structure 112 of the light-absorbing member 110 has the above-mentioned configuration, even if light having a wavelength of the visible spectrum or longer enters, the light is not reflected but can be absorbed by the substrate 111 substantially completely.

Even in the antireflection structure 112, each of the structural elements 112a has a shape being recessed from a reference face 113 corresponding to the macroscopic curve of the substrate. The structural elements 112a are arranged so that the straight lines connecting the reference face 113 to the tips of the respective structural elements 112a are nearly parallel to one another. In particular, since the structural element in accordance with the modified example of this embodiment has the shape of a cone, the straight line corresponds to the straight line connecting the center of the bottom face of the cone of each structural element 112a to the vertex of the cone and is the center axis of the cone. In other words, each structural element 112a of the antireflection structure 112 in accordance with this embodiment has a shape such that when the structural element is viewed from the direction of the straight line serving as a specific reference direction common to all the structural elements, the whole area of its side face can be seen.

The inclination state of the internal face of each structural element of the antireflection structure 112 also satisfies the above-mentioned angular relational expression of 63.4 degrees≦θ<90 degrees. Also in the modified example, light-absorbing efficiency can be raised further by forming an antireflection structure having cones with a depth corresponding to two or three times the period or more. In this case, the angle θ becomes 75.9 degrees≦θ<90 degrees or 80.5 degrees≦θ<90 degrees, respectively, as in the case of the protrusions having the shape of a cone with the height.

Furthermore, also in the modified example, other than visible light, ultraviolet light (the wavelength of ultraviolet spectrum: 70 nm to 400 nm), near-infrared light (the wavelength of near-infrared spectrum: 700 nm to 2 μm) and far-infrared light (the wavelength of far-infrared spectrum: 2 μm to 13 μm) can also be used; even in this case, the antireflection structure is formed at a period smaller than the respective wavelengths. Even in this case, the depth of the structural element is desired to be a depth corresponding to the period or more, two times the period or more, or three times the period or more.

Moreover, also in the modified example, the structural element is not limited to have the shape of a cone, but the shape may be a pyramid, a cylinder, a prism, a bell, a truncated cone, a truncated pyramid or the like. Still further, the structural element is not required to have a strictly geometrical shape, but its shape should only substantially be the shape of a cone or pyramid, a column, a bell, or a truncated cone or pyramid, as in the above-mentioned case.

Second Embodiment

Figure 9:
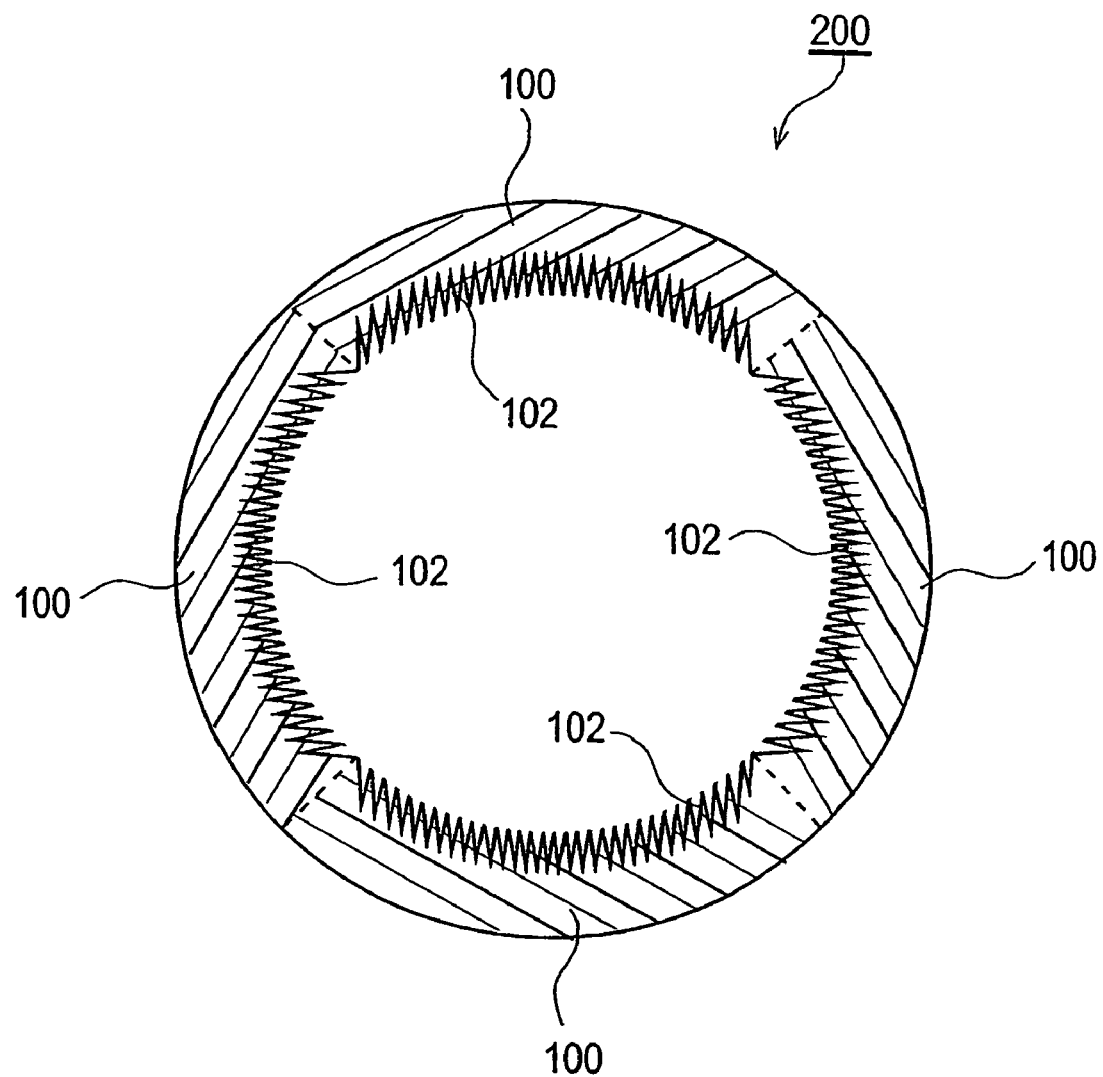
FIG. 9 is a schematic cross-sectional view showing a lens barrel in accordance with a second embodiment of the present invention, being cut off by a plane perpendicular to the optical axis thereof.
Figure 10:
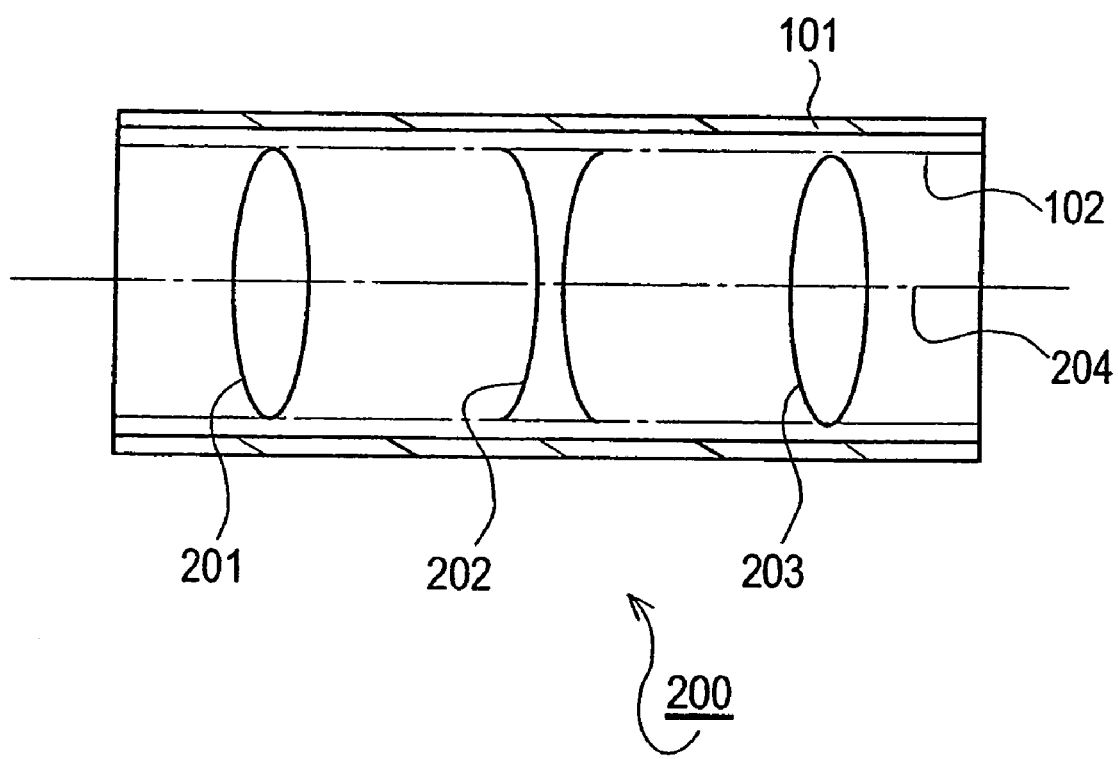
FIG. 10 is a schematic cross-sectional view showing the lens barrel in accordance with the second embodiment of the present invention, being cut off by a plane including the optical axis thereof.

FIG. 9 is a schematic cross-sectional view showing a lens barrel in accordance with a second embodiment of the present invention, being cut off by a plane perpendicular to the optical axis thereof, and FIG. 10 is a schematic cross-sectional view showing the lens barrel (with lenses mounted), being cut off by a plane including the optical axis thereof.

As shown in FIG. 9, the lens barrel 200 in accordance with this embodiment has a structure where in the light-absorbing members 100 (see FIG. 1), four in number and described in the above-mentioned first embodiment, are prepared and integrated into the shape of a cylinder.

As shown in FIG. 10, the lens barrel 200 in accordance with this embodiment coaxially holds a lens element 201, a lens element 202 and a lens element 203 along the optical axis 204. Since the antireflection structure 102 is formed on the internal circumference face of the lens barrel 200, unnecessary light, such as stray light generated by a luminous flux entering the lens element 201 held inside the lens barrel 200 and having an angle not smaller than the coverage view angle and by reflection on the surfaces of the respective lens elements, is absorbed efficiently by the substrate via the antireflection structure 102. As a result, the unnecessary light can be prevented from entering again the optical path, whereby the generation of ghost and flare is suppressed in the optical system comprising the respective lens elements. In particular, when the optical system is an image-taking optical system of a digital camera or an imaging optical system, such as the projection optical system of a projection image display apparatus, an optical image being excellent in contrast can be formed.

In addition, unnecessary light may occasionally have a constant regularity in a lens barrel or the like. For example, when stray light abundantly enters the internal face of the lens barrel 200 in the normal direction, in each of the light-absorbing members 100, a slight difference occurs in the effect of reducing reflection between the effect at a position near the central area wherein the antireflection structure 102 is formed and the effect at a position near the periphery thereof (near the boundary with another adjacent light-absorbing member) owing to the difference in the incident angle of the unnecessary light entering the light-absorbing member. When it is necessary to further reduce this difference and to obtain a uniform light-absorbing effect, the height or depth of each of the structural elements of the antireflection structure 102 should only be varied so that the height or depth of each of the structural elements increases gradually in the area from the position near the central area wherein the antireflection structure 102 is formed to the position near the periphery thereof (near the boundary with another adjacent light-absorbing member).

Furthermore, in this embodiment, the lens barrel 200 having the side face shape of a cylinder is taken as an example and described; however, the side face shape of the lens barrel 200 is not limited to a cylinder, but it may be a truncated cone, for example.

Moreover, in this embodiment, the lens barrel 200 formed of a single cylinder is taken as an example and described; however, the lens barrel is applicable to a collapsible lens barrel comprising a plurality of cylindrical members combined so as to be slidable.

Still further, in this embodiment, as the lens barrel 200, a structure wherein a plurality of the light-absorbing members 100 described in the above-mentioned first embodiment are prepared and integrated into the shape of a cylinder is taken as an example and described; however, the structure is not limited to this. For example, separate from the main body of the lens barrel having the shape of a cylinder, an antireflection structure may be formed on a flexible sheet member, and the sheet member may be bonded to the internal circumference face of the main body of the lens barrel. The sheet member can be made of either a black material or a transparent material. The sheet member made of a black material can be obtained by including a dye, such as a black dye (for example, Plast Black 8950 or 8970 produced by Arimoto Chemical Co., Ltd.) obtained by mixing cyan, magenta, yellow and other coloring matters, into a base material, such as polycarbonate resin or acrylic resin. Moreover, the sheet member can also be obtained by including a pigment, such as carbon black. Still further, instead of the entire internal circumference face of the lens barrel, at least part thereof may be formed of the light-absorbing member 100 or the light-absorbing member 110 described in the above-mentioned first embodiment. Still further, in this embodiment, the internal face of the lens barrel 200 is divided into four areas in the longitudinal direction thereof; however, the number of the divisions is a given number, and the internal face should only be divided into at least three areas.

Third Embodiment

Figure 11A:
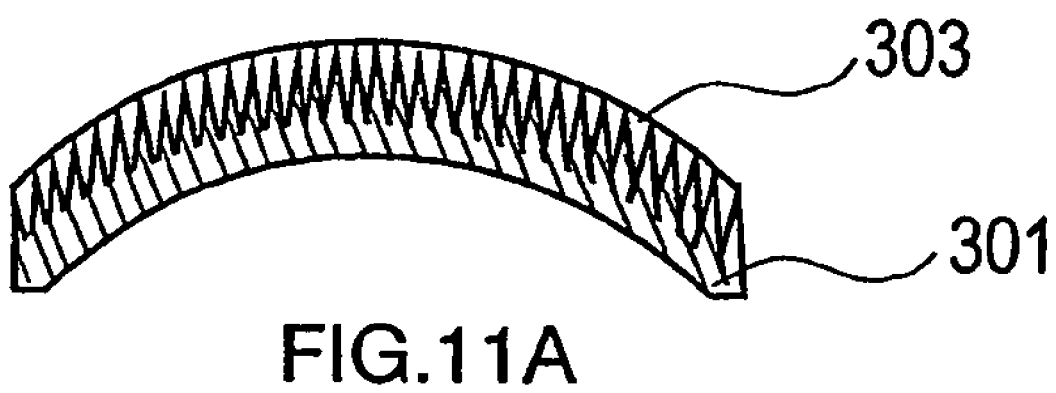
FIGS. 11A and B are a schematic cross-sectional view showing lens barrel forming molds in accordance with a third embodiment of the present invention, being cut off by a plane perpendicular to the longitudinal direction thereof.
Figure 11B:
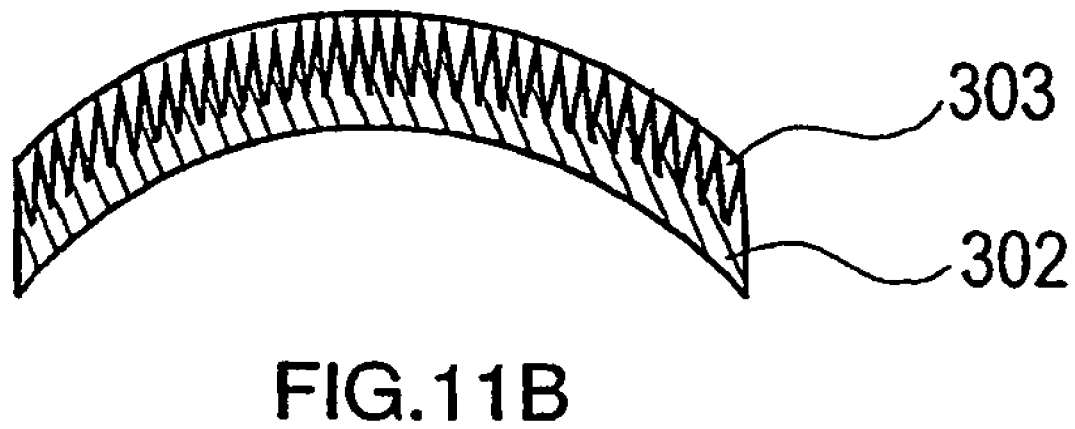
Figure 12:
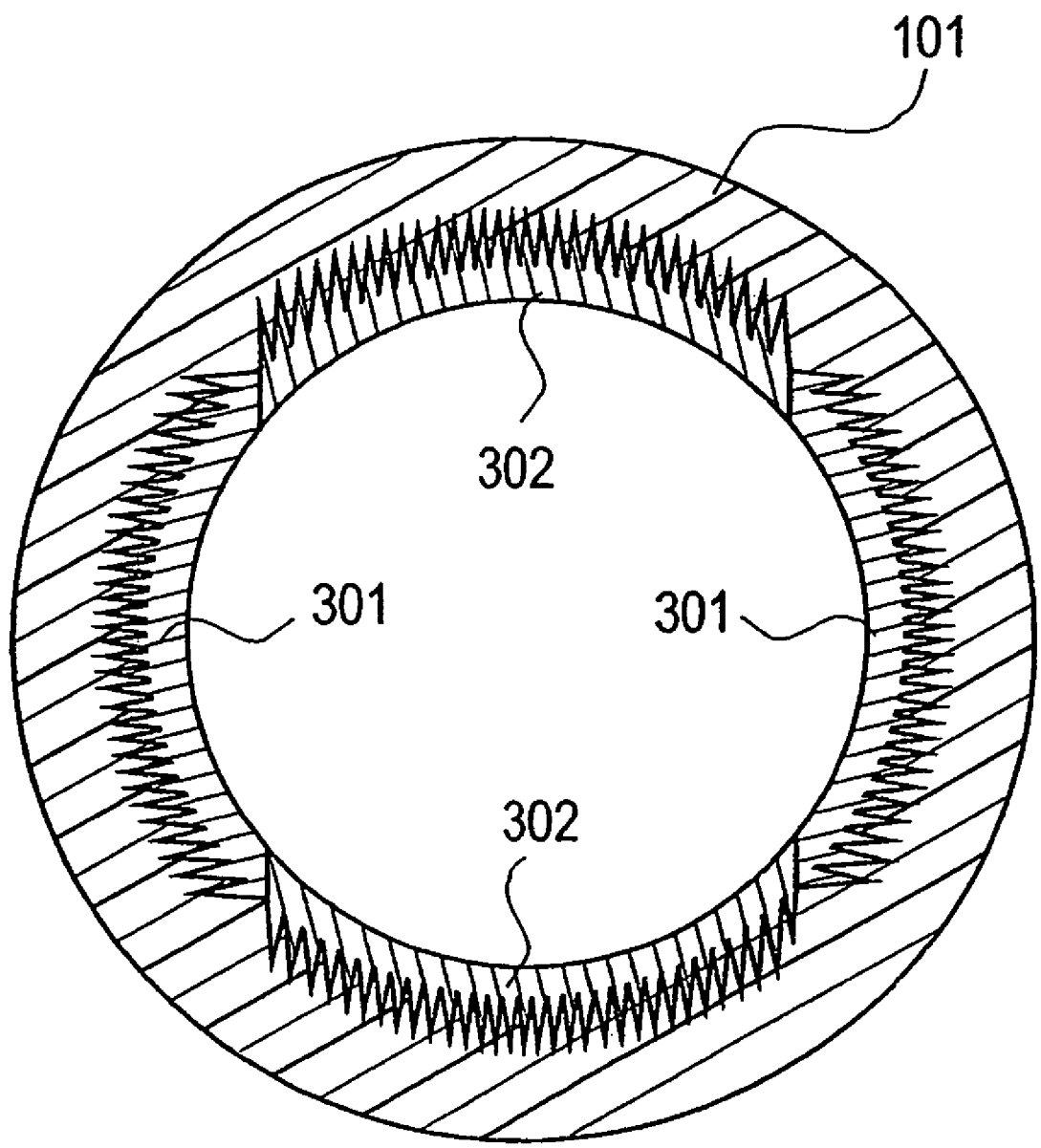
FIG. 12 is a schematic cross-sectional view showing the state at the time when the lens barrel forming mold in accordance with the third embodiment of the present invention is set on the substrate of the lens barrel, being cut off by a plane perpendicular to the optical axis thereof.

FIG. 11 is a schematic cross-sectional view showing a lens barrel forming mold in accordance with a third embodiment of the present invention, being cut off by a plane perpendicular to the longitudinal direction thereof. When a lens barrel is formed, the lens barrel forming mold shown in FIG. 11A is a first mold 301 to be set first on the substrate of the lens barrel, and the lens barrel forming mold shown in FIG. 11B is a second mold 302 to be set on the substrate of the lens barrel after the first mold 301 is set. In addition, FIG. 12 is a schematic cross-sectional view showing the state at the time when the lens barrel forming mold in accordance with the third embodiment of the present invention is set on the substrate of the lens barrel, being cut off by a plane perpendicular to the optical axis thereof.

As shown in FIG. 11, each of the first and second molds 301 and 302 is configured so as to form part of the side face of a cylinder, and two of each are prepared. In other words, the first and second molds 301 and 302 are obtained by dividing a single cylinder into four pieces in the longitudinal direction thereof. In addition, both sides of the first and second molds 301 and 302 are processed into shapes such that they do not interfere with each other when the first and second molds 301 and 302 are set on the substrate 101 of the lens barrel 200 in the above-mentioned sequence (see FIG. 12).

On the external surface serving as the transfer face of each of the first and second molds 301 and 302, an antireflection structure having a pattern inverted from that of the antireflection structure 102 on the internal face of the lens barrel 200, that is, an antireflection structure 303 comprising structural elements formed of recesses having the shape of a cone and arranged at a period smaller than the wavelength of the light whose reflection should be reduced is formed. The center axes of the recesses, each serving as a structural element, are parallel to one another.

The antireflection structures 303 of the first and second molds 301 and 302 serving as the lens barrel forming mold in accordance with this embodiment are desired to be formed using X-rays. For example, when the lens barrel 200 having an inside diameter of 30 mm is formed using the first and second molds 301 and 302 divided into four pieces as described above, the amount of the sag of the external surface of each of the molds 301 and 302 becomes 4.39 mm. Hence, it is very difficult to form the antireflection structure 303 on the external surface of each of the molds 301 and 302 using the electronic beam drawing method. Furthermore, since the maximum inclination angle of the internal face of the cone serving as each of the structural elements of the antireflection structure 303 is 45 degrees, it is difficult to form the antireflection structure 303 on the external surface of each of the molds 301 and 302 using the two-beam interference exposure method.

However, the antireflection structure 303 can be formed by using the X-ray exposure method. More specifically, the surface of a substrate formed of a high molecular compound having a property of being photosensitive to X-rays, such as poly(methyl methacrylate) (PMMA), is exposed with X-rays having an energy of 1 kJ/cm$^3$ to 20 kJ/cm$^3$, and the surface is nickel-plated, and then the substrate is removed, whereby a metal portion having the antireflection structure 303 is obtained; hence, the lens barrel forming mold (the first and second molds 301 and 302) should be produced by using this.

A case wherein the antireflection structure 303 is formed by using X-rays is described above; however, it is also possible to form the antireflection structure 303 by using ultraviolet light or light having a wavelength smaller than that of ultraviolet light. In this case, formylated novolac resin should be used as a high molecular compound having a property of being photosensitive to ultraviolet light or light having a wavelength smaller than that of ultraviolet light.

Next, a method for forming the lens barrel 200 (for forming the antireflection structure 303 on the internal surface of the substrate 101) by using the lens barrel forming mold in accordance with this embodiment will be described.

First, while the substrate 101 having the shape of a cylinder and made of the black material (a light-absorbing material) described in the above-mentioned second embodiment is heated to approximately 180° C., two first molds 301 are set on the internal surface of the substrate 101. Then, two second molds 302 are set on the internal surface of the substrate 101, each disposed between the two first molds 301, and the patterns of the antireflection structure 303 formed on the external surfaces of the first and second molds 301 and 302 are transferred to the internal surface of the substrate 101 (see FIG. 12). Then, the whole is cooled, and the first and second molds 301 and 302 are separated. Hence, the lens barrel 200 having the microscopic antireflection structure 303 formed on the internal surface of the substrate 101 at a period smaller than the wavelength of incident light is obtained. In this case, in the antireflection structure 303 formed on the external surfaces of the first and second molds 301 and 302, the center axes of the cones, each serving as the structural element, are parallel to one another; hence, by separating the second mold 302 and the first mold 301 in this sequence in the direction of each center axis, the lens barrel 200 can be formed without damaging the respective antireflection structures 102.

In this embodiment, the number of the divisions of the lens barrel forming mold is four; however, the number of the divisions can be made appropriate if it is three or more. In addition, in this embodiment, the lens barrel forming mold having the antireflection structure 303 formed on the external surface thereof is taken as an example and described; however, when a lens barrel having an antireflection structure on the external surface thereof is formed, a lens barrel forming mold having an antireflection structure formed on the internal surface thereof is used.

Furthermore, the antireflection structure of the lens barrel forming mold is not limited to the structure described in this embodiment, but any structures described in the first embodiment can be used if these antireflection structures are configured so that they can be separated from the mold in one direction without being damaged.

Still further, the first and second molds 301 and 302, each configured to form part of the side face of a cylinder, are taken as examples and described in this embodiment; however, when a lens barrel having the shape of a truncated cone is formed, molds, each configured to form part of the side face of a truncated cone, are used.

INDUSTRIAL APPLICABILITY

The light-absorbing member in accordance with the present invention is applicable to all the optical apparatuses requiring elimination of unnecessary light, for example, projection display devices, such as front projectors and rear projectors; multivision systems provided with a plurality of such projection display devices; image-taking devices, such as digital still cameras and camcorders; optical pickup devices; optical fiber communication systems; etc.

The invention claimed is:

1. A light-absorbing member comprising:
a substrate made of a material capable of absorbing light of which reflection is to be prevented, the substrate having the shape of a curve viewed from a macroscopic viewpoint; and
an antireflection structure comprising structural elements arranged on the surface of the curve in an array form at a period smaller than the wavelength of the light, wherein the structural elements have a shape protruding or being recessed from a reference face corresponding to the curve of the substrate, and are arranged so that straight lines connecting from a center portion of each of the structural elements disposed on the reference face to the tips of the respective structural elements are nearly parallel to one another.

2. A light-absorbing member in accordance with claim 1, wherein the length between the reference face and the tip of each of the respective structural elements in the direction along the straight line corresponds to the period or more.

3. A light-absorbing member comprising:
a substrate made of a material capable of absorbing light of which reflection is to be prevented, the substrate having the shape of a curve viewed from a macroscopic viewpoint; and
an antireflection structure comprising structural elements arranged on the surface of the curve in an array form at a period smaller than the wavelength of the light, wherein:
the structural elements have a shape protruding or being recessed from a reference face corresponding to the curve of the substrate, and are arranged so that the straight lines connecting the reference face to the tips of the respective structural elements are nearly parallel to one another, and
height or depth of each of the structural elements of the antireflection structure varies so that the height or depth increases gradually from a position near a central area in an area in which the antireflection structure is formed to a position near a periphery in the area.

4. A light-absorbing member in accordance with claim 3, wherein each of the structural elements satisfies a relationship of $\theta$<90 degrees,
where $\theta$ represents an angle formed by the normal vector of the side face of the protruding shape or the internal face of the recessed shape with respect to the reference vector in the direction from the reference face to the tip of each structural element.

5. A light-absorbing member in accordance with claim 3, wherein the antireflection structure is integrally formed as part of the substrate.

6. A light-absorbing member in accordance with claim 3, wherein the antireflection structure is formed on a sheet member bonded to the substrate.

7. A light-absorbing member in accordance with claim 3, wherein the length between the reference face and the tip of each of the respective structural elements in the direction along the straight line corresponds to the period or more.

8. A light-absorbing member in accordance with claim 3, wherein the shape of the curve is a recess.

9. A light-absorbing member in accordance with claim 3, wherein the amount of a sag of the surface of the curve is 20 μm or more.

10. A light-absorbing member in accordance with claim 3, wherein the light is selected from the group consisting of ultraviolet light, visible light, near-infrared light and far-infrared light.

11. A light-absorbing member in accordance with claim 3, wherein each of the structural elements is a protrusion having a nearly conical shape or a recess having a nearly conical shape.

12. A light-absorbing member in accordance with claim 3, wherein each of the structural elements is a protrusion having a nearly bell shape or a recess having a nearly bell shape.

13. A light-absorbing member in accordance with claim 3, wherein each of the structural elements is a protrusion having a nearly truncated conical or pyramidal shape or a recess having a nearly truncated conical or pyramidal shape.

14. A light-absorbing member in accordance with claim 3, wherein each of the structural elements is a protrusion having a nearly columnar shape or a recess having a nearly columnar shape.

15. A light-absorbing member in accordance with claim 3, wherein in each of the structural elements, the bottom face of the protrusion on the reference face or the upper face of the recess in the reference face has a shape selected from the group consisting of a nearly circular shape, a nearly elliptical shape, a nearly rectangular shape and a nearly polygonal shape.

16. A light-absorbing member in accordance with claim 3, wherein the substrate includes a dye.

17. A light-absorbing member in accordance with claim 3, wherein the substrate includes a pigment.

18. A lens barrel comprising three or more light-absorbing members, wherein
the shape of the lens barrel is a cylinder formed from three or more light-absorbing members, and wherein
each of the light-absorbing members comprises
a substrate made of a material capable of absorbing light of which reflection is to be prevented, the substrate having the shape of a curve viewed from a macroscopic viewpoint, and
an antireflection structure comprising structural elements arranged on the surface of the curve in an array form at a period smaller than the wavelength of the light, in which
the structural elements have a shape protruding or being recessed from a reference face corresponding to the curve of the substrate, and are arranged so that the straight lines connecting the reference face to the tips of the respective structural elements are nearly parallel to one another,
the shape of the curve is a recess, and
height or depth of each of the structural elements of the antireflection structure varies so that the height or depth increases gradually from a position near a central area in an area in which the antireflection structure is formed to a position near a periphery in the area.

* * * * *